US008989485B2

(12) United States Patent
Chulinin et al.

(10) Patent No.: US 8,989,485 B2
(45) Date of Patent: Mar. 24, 2015

(54) DETECTING A JUNCTION IN A TEXT LINE OF CJK CHARACTERS

(71) Applicant: ABBYY Development LLC, Moscow (RU)

(72) Inventors: Yuri Chulinin, Moscow (RU); Oleg Senkevich, Ivanovo (RU)

(73) Assignee: ABBYY Development LLC (RU)

( * ) Notice: Subject to any disclaimer, the term of this patent is extended or adjusted under 35 U.S.C. 154(b) by 0 days.

(21) Appl. No.: 14/053,208

(22) Filed: Oct. 14, 2013

(65) Prior Publication Data

US 2014/0126812 A1 May 8, 2014

Related U.S. Application Data

(63) Continuation-in-part of application No. 13/457,968, filed on Apr. 27, 2012, now Pat. No. 8,559,718.

(51) Int. Cl.
*G06K 9/00* (2006.01)
*G06K 9/46* (2006.01)
*G06K 9/34* (2006.01)

(52) U.S. Cl.
CPC ................ *G06K 9/4642* (2013.01); *G06K 9/00* (2013.01); *G06K 9/00375* (2013.01); *G06K 9/34* (2013.01); *G06K 9/342* (2013.01); *G06K 9/4647* (2013.01); *G06K 9/469* (2013.01); *G06K 2209/013* (2013.01)
USPC .......................................................... 382/165

(58) Field of Classification Search
USPC .................................................. 382/170, 165
See application file for complete search history.

(56) References Cited

U.S. PATENT DOCUMENTS 4,706,212 A 11/1987 Toma
4,996,665 A 2/1991 Nomura
5,068,789 A 11/1991 Van Vliembergen
5,128,865 A 7/1992 Sadler
5,146,405 A 9/1992 Church
5,175,684 A 12/1992 Chong
5,197,121 A 3/1993 Miyoshi et al.

(Continued)

FOREIGN PATENT DOCUMENTS

EP 2400400 12/2001
JP 11224346 8/1999

(Continued)

OTHER PUBLICATIONS

Notice of Allowance issued in U.S. Appl. No. 13/457,968 mailed Jun. 11, 2013 (9 pages).

(Continued)

*Primary Examiner* — Duy M Dang
(74) *Attorney, Agent, or Firm* — LeighAnn Weiland; Veronica Weinstein

(57) ABSTRACT

A method for detecting a junction in a received image of the line of text to update a junction list with descriptive data is provided. The method includes creating a color histogram based on a number of color pixels in the received image of the line of text and detecting, based at least in part on the received image of the line of text, a rung within the received image of the line of text. The method also includes identifying a horizontal position of the detected rung in the received image of the line of text and identifying a gateway on the color histogram, wherein the identified gateway is associated with the detected rung. The junction list is updated with data including a description of the identified gateway.

20 Claims, 12 Drawing Sheets

100
104
102

(56) References Cited

U.S. PATENT DOCUMENTS 5,268,839 A 12/1993 Kaji
5,301,109 A 4/1994 Landauer et al.
5,317,646 A 5/1994 Sang, Jr. et al.
5,339,412 A 8/1994 Fueki
5,386,556 A 1/1995 Hedin et al.
5,418,717 A 5/1995 Su et al.
5,422,743 A 6/1995 Farrell et al.
5,426,583 A 6/1995 Uribe-Echebarria Diaz De Mendibil
5,428,694 A 6/1995 Betts et al.
5,434,962 A 7/1995 Kyojima et al.
5,459,827 A 10/1995 Allouche et al.
5,475,587 A 12/1995 Anick et al.
5,477,451 A 12/1995 Brown et al.
5,490,061 A 2/1996 Tolin et al.
5,497,319 A 3/1996 Chong et al.
5,510,981 A 4/1996 Berger et al.
5,550,934 A 8/1996 Van Vliembergen et al.
5,555,101 A 9/1996 Larson et al.
5,555,362 A 9/1996 Yamashita et al.
5,559,693 A 9/1996 Anick et al.
5,633,996 A 5/1997 Hayashi et al.
5,677,835 A 10/1997 Carbonell et al.
5,678,051 A 10/1997 Aoyama
5,687,383 A 11/1997 Nakayama et al.
5,696,980 A 12/1997 Brew
5,701,500 A 12/1997 Ikeo et al.
5,715,468 A 2/1998 Budzinski
5,721,938 A 2/1998 Stuckey
5,724,593 A 3/1998 Hargrave, III et al.
5,727,220 A 3/1998 Hohensee et al.
5,737,617 A 4/1998 Bernth et al.
5,752,051 A 5/1998 Cohen
5,768,603 A 6/1998 Brown et al.
5,784,489 A 7/1998 Van Vliembergen et al.
5,787,410 A 7/1998 McMahon
5,794,050 A 8/1998 Dahlgren et al.
5,794,177 A 8/1998 Carus et al.
5,822,454 A 10/1998 Rangarajan
5,826,219 A 10/1998 Kutsumi
5,826,220 A 10/1998 Takeda et al.
5,848,184 A 12/1998 Taylor et al.
5,848,186 A 12/1998 Wang et al.
5,848,385 A 12/1998 Poznanski et al.
5,873,056 A 2/1999 Liddy et al.
5,884,247 A 3/1999 Christy
5,895,446 A 4/1999 Takeda et al.
5,966,686 A 10/1999 Heidorn et al.
5,999,664 A 12/1999 Mahoney et al.
6,002,798 A 12/1999 Palmer et al.
6,006,221 A 12/1999 Liddy et al.
6,055,528 A 4/2000 Evans
6,076,051 A 6/2000 Messerly et al.
6,081,774 A 6/2000 de Hita et al.
6,139,201 A 10/2000 Carbonell et al.
6,182,028 B1 1/2001 Karaali et al.
6,223,150 B1 4/2001 Duan et al.
6,233,544 B1 5/2001 Alshawi
6,243,669 B1 6/2001 Horiguchi et al.
6,243,670 B1 6/2001 Bessho et al.
6,246,977 B1 6/2001 Messerly et al.
6,260,008 B1 7/2001 Sanfilippo
6,266,642 B1 7/2001 Franz
6,275,789 B1 8/2001 Moser et al.
6,278,967 B1 8/2001 Akers et al.
6,282,507 B1 8/2001 Horiguchi et al.
6,285,978 B1 9/2001 Bernth et al.
6,327,386 B1 12/2001 Mao et al.
6,330,530 B1 12/2001 Horiguchi et al.
6,345,244 B1 2/2002 Clark
6,356,864 B1 3/2002 Foltz et al.
6,356,865 B1 3/2002 Franz et al.
6,381,598 B1 4/2002 Williamowski et al.
6,400,845 B1 6/2002 Volino
6,456,738 B1 9/2002 Tsukasa
6,463,404 B1 10/2002 Appleby
6,470,306 B1 10/2002 Pringle et al.
6,562,077 B2 5/2003 Bobrow et al.
6,601,026 B2 7/2003 Appelt et al.
6,604,101 B1 8/2003 Chan et al.
6,658,627 B1 12/2003 Gallup et al.
6,721,697 B1 4/2004 Duan et al.
6,760,695 B1 7/2004 Kuno et al.
6,778,949 B2 8/2004 Duan et al.
6,871,174 B1 3/2005 Dolan et al.
6,871,199 B1 3/2005 Binnig et al.
6,901,399 B1 5/2005 Corston et al.
6,901,402 B1 5/2005 Corston-Oiiver et al.
6,928,448 B1 8/2005 Franz et al.
6,937,974 B1 8/2005 D'agostini
6,941,521 B2 9/2005 Lin et al.
6,947,923 B2 9/2005 Cha et al.
6,957,383 B1 10/2005 Smith
6,965,857 B1 11/2005 Decary
6,983,240 B2 1/2006 Ait-Mokhtar et al.
7,013,264 B2 3/2006 Dolan et al.
7,020,601 B1 3/2006 Hummel et al.
7,027,974 B1 4/2006 Busch et al.
7,028,250 B2 4/2006 Ukrainczyk et al.
7,050,964 B2 5/2006 Menzes et al.
7,069,501 B2 6/2006 Kunitake et al.
7,085,708 B2 8/2006 Manson
7,146,358 B1 12/2006 Gravano et al.
7,149,347 B1 12/2006 Wnek
7,167,824 B2 1/2007 Kallulli
7,171,615 B2 1/2007 Jensen et al.
7,191,115 B2 3/2007 Moore
7,200,550 B2 4/2007 Menezes et al.
7,263,488 B2 8/2007 Chu et al.
7,269,594 B2 9/2007 Corston-Oiiver et al.
7,310,635 B2 12/2007 Tucker
7,346,215 B2 3/2008 Shih et al.
7,346,493 B2 3/2008 Ringger et al.
7,356,457 B2 4/2008 Pinkham et al.
7,383,496 B2 6/2008 Fukuda
7,447,624 B2 11/2008 Fuhrmann
7,475,015 B2 1/2009 Epstein et al.
7,529,408 B2 5/2009 Vohariwatt et al.
7,596,485 B2 9/2009 Campbell et al.
7,653,921 B2 1/2010 Herley
7,672,831 B2 3/2010 Todhunter et al.
7,707,025 B2 4/2010 Whitelock
7,761,787 B2 7/2010 Singleton et al.
8,056,001 B2 11/2011 Chao
8,064,096 B2 11/2011 Waara
8,077,973 B2 12/2011 Dong
8,078,450 B2 12/2011 Anisimoviich et al.
8,145,473 B2 3/2012 Anisimoviich et al.
8,214,199 B2 7/2012 Anisimoviich et al.
8,229,730 B2 7/2012 Van Den Berg et al.
8,229,944 B2 7/2012 Latzina et al.
8,271,453 B1 9/2012 Pasca et al.
8,285,728 B1 10/2012 Rubin
8,301,633 B2 10/2012 Cheslow
8,402,036 B2 3/2013 Blair-Goldensohn et al.
8,533,188 B2 9/2013 Yan et al.
8,548,951 B2 10/2013 Solmer et al.
8,577,907 B1 11/2013 Singhal et al.
2001/0014902 A1 8/2001 Hu et al.
2001/0029455 A1 10/2001 Chin et al.
2002/0029232 A1 3/2002 Bobrow et al.
2002/0040292 A1 4/2002 Marcu
2002/0064316 A1 5/2002 Takaoka
2003/0004702 A1 1/2003 Higinbotham
2003/0158723 A1 8/2003 Masuichi et al.
2003/0176999 A1 9/2003 Calcagno et al.
2003/0182102 A1 9/2003 Corston-Oliver et al.
2003/0204392 A1 10/2003 Finnigan et al.
2004/0098247 A1 5/2004 Moore
2004/0122656 A1 6/2004 Abir
2004/0153465 A1 8/2004 Singleton et al.
2004/0172235 A1 9/2004 Pinkham et al.
2004/0193401 A1 9/2004 Ringger et al.
2004/0254781 A1 12/2004 Appleby

(56) References Cited

U.S. PATENT DOCUMENTS

| | | | |
|---|---|---|---|
| 2005/0010421 | A1 | 1/2005 | Watanabe et al. |
| 2005/0015240 | A1 | 1/2005 | Appleby |
| 2005/0021322 | A1 | 1/2005 | Richardson et al. |
| 2005/0067482 | A1 | 3/2005 | Wu et al. |
| 2005/0080613 | A1 | 4/2005 | Colledge et al. |
| 2005/0086047 | A1 | 4/2005 | Uchimoto et al. |
| 2005/0137853 | A1 | 6/2005 | Appleby |
| 2005/0155017 | A1 | 7/2005 | Berstis |
| 2005/0171757 | A1 | 8/2005 | Appleby |
| 2005/0209844 | A1 | 9/2005 | Wu et al. |
| 2005/0240392 | A1 | 10/2005 | Munro, Jr. et al. |
| 2006/0004563 | A1 | 1/2006 | Campbell et al. |
| 2006/0080079 | A1 | 4/2006 | Yamabama |
| 2006/0095250 | A1 | 5/2006 | Chen et al. |
| 2006/0136193 | A1 | 6/2006 | Lux-Pogodalla et al. |
| 2006/0217964 | A1 | 9/2006 | Kamatani et al. |
| 2006/0224378 | A1 | 10/2006 | Chino et al. |
| 2006/0293876 | A1 | 12/2006 | Kamatani et al. |
| 2007/0010990 | A1 | 1/2007 | Woo |
| 2007/0016398 | A1 | 1/2007 | Buchholz |
| 2007/0041041 | A1 | 2/2007 | Engbrocks et al. |
| 2007/0083359 | A1 | 4/2007 | Bender |
| 2007/0100601 | A1 | 5/2007 | Kimura |
| 2007/0133067 | A1 | 6/2007 | Garg |
| 2007/0168382 | A1 | 7/2007 | Tillberg et al. |
| 2008/0002893 | A1 | 1/2008 | Vincent et al. |
| 2008/0025608 | A1 | 1/2008 | Meunier |
| 2008/0170786 | A1 | 7/2008 | Tomizawa et al. |
| 2008/0195968 | A1 | 8/2008 | Schacht |
| 2009/0028437 | A1 | 1/2009 | Hirohata |
| 2009/0074296 | A1 | 3/2009 | Filimonova et al. |
| 2009/0216794 | A1 | 8/2009 | Saptharishi |
| 2011/0055188 | A1 | 3/2011 | Gras |
| 2011/0301941 | A1 | 12/2011 | De Vocht |
| 2012/0023104 | A1 | 1/2012 | Johnson et al. |
| 2012/0030226 | A1 | 2/2012 | Holt et al. |
| 2012/0131060 | A1 | 5/2012 | Heidasch |
| 2012/0197885 | A1 | 8/2012 | Patterson |
| 2012/0203777 | A1 | 8/2012 | Laroco, Jr. et al. |
| 2012/0221553 | A1 | 8/2012 | Wittmer et al. |
| 2012/0246153 | A1 | 9/2012 | Pehle |
| 2012/0296897 | A1 | 11/2012 | Hin-Jing et al. |
| 2013/0013291 | A1 | 1/2013 | Bullock et al. |
| 2013/0054589 | A1 | 2/2013 | Cheslow |
| 2013/0091113 | A1 | 4/2013 | Gras |
| 2013/0138696 | A1 | 5/2013 | Turdakov et al. |
| 2013/0185307 | A1 | 7/2013 | El-Yaniv et al. |
| 2013/0254209 | A1 | 9/2013 | Kang et al. |
| 2013/0282703 | A1 | 10/2013 | Puterman-Sobe et al. |
| 2013/0311487 | A1 | 11/2013 | Moore et al. |
| 2013/0318095 | A1 | 11/2013 | Harold |
| 2014/0012842 | A1 | 1/2014 | Yan et al. |

FOREIGN PATENT DOCUMENTS

| | | |
|---|---|---|
| JP | 2004355528 | 12/2004 |
| WO | 2011160204 | 12/2011 |

OTHER PUBLICATIONS

Hutchins, “Machine Translation: Past, Present, Future”, 1986, New York: Halsted Press, Chapters 1, 3 and 9, pp. 1-36.

FIG. 1

<My goal was supposed to be a math teacher, however, I ended up to be hired by a personal computer company.>

Taking programing classes in my college and purchasing a microcomputer seemed to be a trigger for working with a computer. One day, when I got news that a new, high performance computer had been on r sale, I chose the computer company as a part time job. The job was to answer to customer's questions in the show room, and I was allowed to use those computers anytime when I had nothing to do.

Fall Down Seven Times, Get up Eight

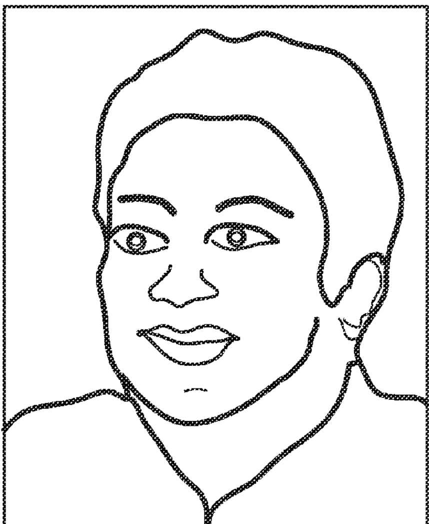

Handmade Search Engine by Grope

"You soon get tired of one thing. I wonder how you can keep taking care of high school students by three years as a teacher", one day an executive of the company said, which made me sense certainly. Then, I made a decision to get a job in the company.It was a small venture business where I was working for. While working there being given a lot of different roles at the developmental fields, every day was absolutely fulfillment for me. The company was happened to be sold by TOSHIBA, Inc., when it was my tenth year. If you work for a corporation, your goal should be getting a position as "president". However, TOSHIBA had more than thirty executives; many of them were so smart people, it was totally impossible for me to be the president.

Born in Tokyo in 1957. Graduate from Tokyo University of Science in 1979, got employed by Sword Machine Systems. Moving to Soft Bank Laboratory, Soft Bank, then funded Yahoo Inc, in January 1996. President & CEO Yahoo Inc from January 1996. Jazz music and reading science fiction as hobby and interest. His current favorite is "Perry Rhodan Universe Hero" , which has been written by multiple writers novel relay in Germany.

Figure 8:
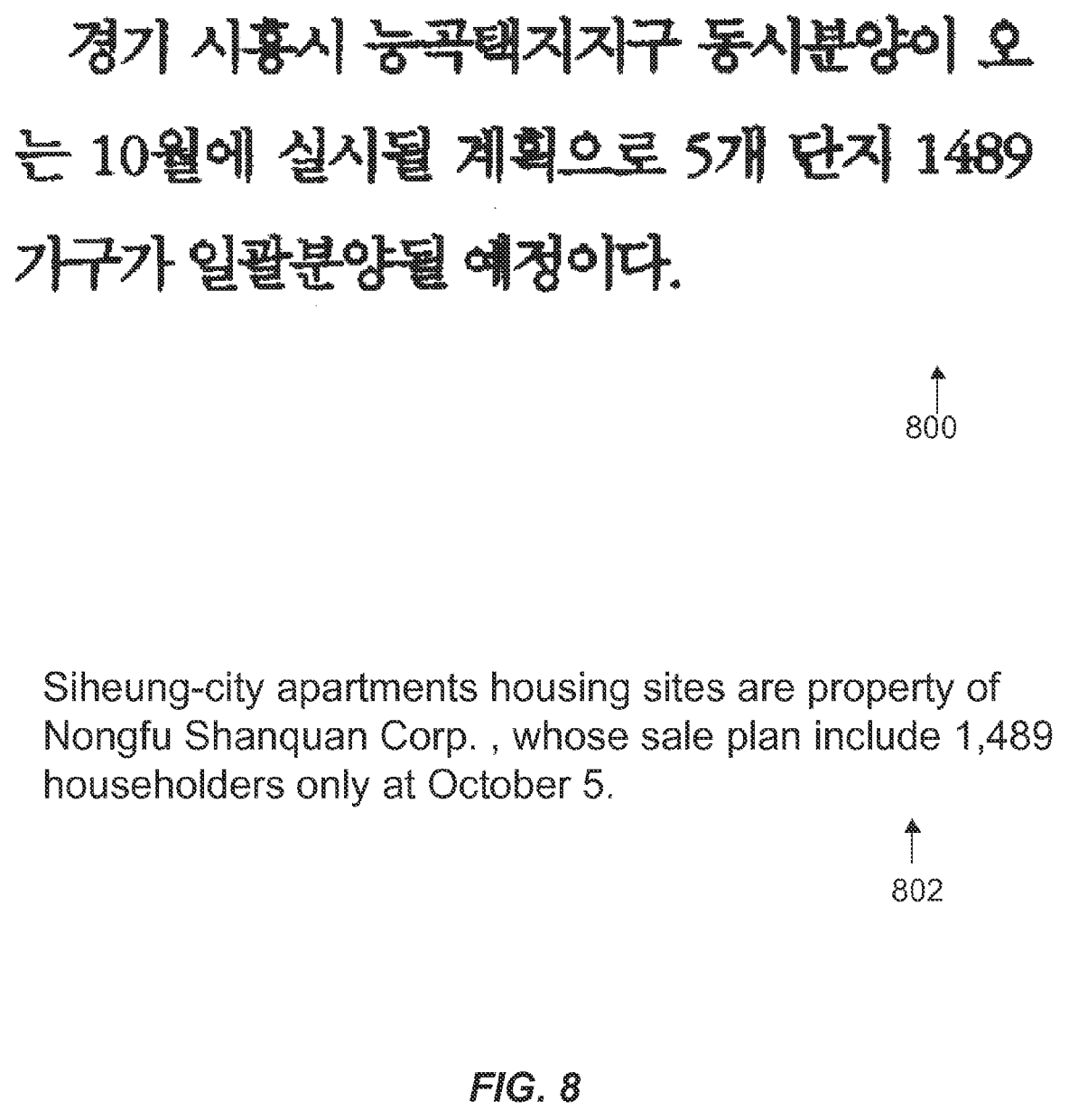

Siheung-city apartments housing sites are property of Nongfu Shanquan Corp. , whose sale plan include 1,489 householders only at October 5.

DETECTING A JUNCTION IN A TEXT LINE OF CJK CHARACTERS

CROSS-REFERENCE TO RELATED APPLICATIONS

This application is a continuation-in-part of U.S. patent application Ser. No. 13/457,968, titled "DEFINING A LAYOUT OF TEXT LINES OF CJK AND NON-CJK CHARACTERS" filed Apr. 27, 2012, now U.S. Pat. No. 8,559,718, the disclosure of which is herewith incorporated by reference in its entirety.

BACKGROUND

The present disclosure is related to functions traditionally associated with text pre-processing and optical character recognition (OCR) and specifically to segmenting lines and paragraphs and isolating handwritten and printed Chinese, Japanese and Korean (CJK) characters, glyphs or tetragraphs in images of documents containing CJK and other types of glyphic characters including documents compounded with characters of another language.

A document to be processed by OCR is initially and usually presented as an electronic image obtained from a camera, a scanner, or from conversion from one file format to another. In document processing, OCR is typically performed automatically or semi-automatically by a software program or a program module executed on a personal, mobile or other computer. However, there are many barriers to successful OCR, or OCR processing with a high degree of successful recognition, especially when attempting to recognize CJK and other types of glyphic characters.

Documents written by CJK speakers include characters of one or more glyphic languages and increasingly include non-standard characters (letters, symbols, numeral, punctuation marks) from one or more other languages including European languages. Such other non-CJK languages are generally based on a Latin, Cyrillic or other non-glyphic alphabet. Herein, reference is made to CJK characters, but such reference is shorthand for all varieties of glyphs, characters, tetragraphs, tetragrams, symbols, ideographs, ideograms and the like.

Written or printed text in a European language usually consists of repeated use of 100-150 standardized characters to form phonetic words. In contrast, texts in CJK languages usually use a subset of 30,000-40,000 available characters. A typical person routinely exposed to CJK characters encounters about 5,000 different CJK characters per day. Because of this characteristic of CJK and other glyph languages, it is difficult or impossible to recognize CJK texts by ordinary methods and techniques used in the recognition of characters and words in Roman, Latin or Cyrillic alphabets.

FIG. 1 is an example of an image of a document 100 that includes CJK text 102 (Japanese) in a horizontal direction and CJK text in a vertical direction. The CJK text 102 also includes Roman characters mixed with the CJK characters. The document 100 further includes a region 104 with a portrait or picture and a caption under the picture. FIG. 2 is an English translation 200 of the CJK text of FIG. 1.

While reading CJK characters is a relatively easy task for a person, a machine often has difficulty isolating and recognizing CJK characters. One difficulty arises when alphanumeric and other non-CJK characters are mixed into traditional CJK writing. Another difficulty arises when the direction of writing cannot easily be ascertained. CJK writing often does not include any punctuation. CJK writing may be in different directions on a single page of text. Further difficulties can arise when both traditional and simplified CJK characters are mixed together, as is often the case in formal printed publications. Another kind of difficulty which is frequent for the Korean texts is a splicing ("gluing") of neighbor characters.

There are various methods of attempting to overcome the difficulties in recognizing CJK characters. Analytically, recognition can generally be divided into two types of methods. The first type is by recognizing each character as it is being written—a form of online or active recognition. This type of recognition often involves analyzing strokes as they are entered by a stylus or finger on a touch-sensitive screen.

The second type of recognition involves segmenting individual CJK characters on each page of a document and then recognizing each character by matching it to a character in a database of characters. This type of recognition is termed offline recognition, and can be divided into handwritten character recognition (HCR) and printed character recognition (PCR). In each of these types of offline recognition, feature matching and/or structural analysis is performed. The techniques described herein apply to both HCR and PCR recognition, and generally to all types of offline and online recognition of CJK characters.

CJK characters generally occupy a square area in which the components or strokes of every character are written to fit. This technique allows CJK characters to maintain a uniform size and shape, especially with small printed characters in either sans-serif or serif style. The uniform size and shape allows dense printing of such CJK characters. However, the dense printing can be a source of trouble for segmenting and recognizing CJK characters, lines and paragraphs. There are many ways that segmenting, recognition and processing of CJK characters can be improved.

SUMMARY

Embodiments and techniques described herein include improved methods for segmenting and processing CJK and other types of glyphic characters ahead of other steps traditionally associated with recognition, computer recognition, or optical character recognition (OCR) of text. One result of segmentation is the successful isolation of each CJK character, glyph or tetragraph from the others. One such method involves finding or isolating a line of possible or potential CJK characters in an image of a page of text that includes CJK characters. The line of CJK characters may be horizontal or vertical. Slight line straightening or correction methods may be applied prior to, during or after implementing the methods described herein.

One implementation includes selecting or calculating a window width for a text line of CJK characters or CJK text. The window is at least as tall as the characters in the isolated text line. The beginning of the window is matched to the beginning of the text line and gaps falling in the window are detected. One way to find the gap is to identify a location in the window that is a 4-connected path that is purely vertical where contiguous white pixels are located directly one above another. A distance (e.g., in pixels) from the beginning of the window to each pixel belonging to the gap is calculated. A histogram is built based on these distances. The window is moved to the end of the first found gap and the process is repeated until the window reaches the end of the text line and all gaps in the text line are found.

Next, a linear division graph (LDG) is constructed according to the detected gaps. A histogram of character widths for the given line is obtained. A maximum or desired point in the histogram is found. In a neighborhood of the maximum, an area in the histogram is selected so that the height of each column in the selected area is at least a predefined part of the maximal height. Every column outside of this selected area is considered as a “small” penalty of the LDG arc. This area of small penalties is typically the character width for a given line.

Histogram columns that are outside of the selected area are considered as “special” penalties of the LDG arcs. Maximal special penalties generally correspond to the columns with maximal distances from the beginning of the window to the gap. LDG arcs are each assigned a small penalty or a special penalty according to analysis of the histogram.

Next, paths of the LDG are found, and a sum of the penalties for each path is calculated. LDG paths with transitions from “small” to “special” penalties or vice versa are additionally penalized for each such transition. The path with the minimal penalty sum is chosen or selected as an optimal path. The optimal path may be considered as a scheme for dividing a text line into character cells.

In one aspect, the present disclosure is related to methods for detecting a junction in a received image of a line of text to update a junction list with descriptive data. The method includes creating a color histogram based on a number of color pixels in the received image of the line of text, and detecting, based at least in part on the on the received image of the line of text, a rung within the received image of the line of text. The method further includes identifying a horizontal position of the detected rung in the received image of the line of text, additionally identifying a gateway on the color histogram, where the identified gateway is associated with the detected rung, and updating the junction list with data including a description of the identified gateway. The method further includes summing the number of color pixels in a straight horizontal line of the received image of the line of text. The method further includes detecting a difference in thickness and position in the received image of the line of text. The method further includes dividing the received image of the line of text into three horizontal regions comprising a bottom stripe, a middle stripe, and a top stripe and identifying that the detected rung is positioned in the bottom stripe or the middle stripe. In some embodiments, the method includes identifying a plateau on the created color histogram, where the plateau corresponds to a low level on the created color histogram, and detecting a peak on each side of the plateau on the created color histogram. The method further includes calculating a pixel distance from a start of the received image of the line of text to the identified gateway.

In another aspect, the present disclosure is directed towards systems for detecting a junction in a received image of a line of text to update a junction list with descriptive data. The system includes a memory configured to store processor-executable instructions and a processor operatively coupled to the memory. The processor is configured to create a color histogram based on a number of color pixels in the received image of the line of text and detect, based at least in part on the received image of the line of text a rung. The processor is further configured to identify a horizontal position of the detected rung in the received image of the line of text, additionally identify a gateway on the color histogram, where the identified gateway is associated with the detected rung, and update the junction list with data including a description of the identified gateway. In one embodiment, the created color histogram is a quantity of color pixels in a straight horizontal line of the received image of the line of text and the detected rung is a portion of the received image of the line of text where two neighbor characters are joined. In another embodiment, the horizontal position corresponds to one of three horizontal regions of the received image of the line of text, where the three horizontal regions comprise a bottom stripe, a middle stripe, and a top stripe, and the horizontal position of the detected rung is in the bottom stripe or the middle stripe. In some implementations, the identified gateway is based at least in part on identification of a plateau on the created color histogram, where the plateau corresponds to a low level on the created color histogram. In some implementations, the processor is configured to detect a peak on each side of the plateau on the created color histogram. In some implementations, the description of the identified gateway includes a pixel distance from a start of the received image of the line of text to the identified gateway.

In another aspect, the present disclosure is related to a computer-readable storage medium having computer-readable instructions stored therein, the instructions being executable by a processor of a computing system. The instructions include instructions to create a color histogram based on a number of color pixels in a received image of a line of text and instructions to detect, based at least in part on the on the received image of the line of text, a rung in the received image of the line of text. The instructions further include instructions to identify a horizontal position of the detected rung in the received image of the line of text. The instructions further include instructions to identify a gateway on the created color histogram associated with the detected rung and instructions to update a junction list with data including a description of the identified gateway. In some implementations, the created color histogram is a quantity of color pixels in a straight horizontal line of the received image of the line of text. The instructions further include instructions to identify a plateau on the created color histogram, where the plateau corresponds to a low level on the created color histogram, and where the identified gateway is identified based at least in part on the plateau. The instructions further include instructions to detect a peak on each side of the plateau on the created color histogram.

Other details and features will be apparent from the detailed description.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 1 is an example of an image of a document of CJK text 102 (Japanese) mixed with a few Roman characters.

FIG. 2 is an English translation of the CJK text of FIG. 1.

FIG. 8 illustrates an example of an image of a document of CJK text (Korean) mixed with a few Roman characters and an English translation of the CJK text.

DETAILED DESCRIPTION

In the following description, for purposes of explanation, numerous specific details are set forth in order to provide an understanding of the disclosure. It will be apparent, however, to one skilled in the art that the disclosure can be practiced without these specific details. In other instances, structures and devices are shown only in block diagram form in order to avoid obscuring the disclosure.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Broadly, embodiments and techniques of the present disclosure disclose or relate to methods for defining of a layout of text lines containing Chinese, Japanese, Korean (CJK) and European characters. Reference may be made to a text "line," but also could refer to a word, paragraph, section and page. Similarly, while reference may be made to CJK characters, other terms may be used to mean CJK characters including glyphs, ideographs, tetragraphs, symbols and the like, and vice versa—use of CJK characters may be used to mean glyphs, ideographs, tetragraphs, symbols and the like. The embodiments and techniques described herein apply to all types of offline and online (active) recognition of CJK characters.

Unless stated otherwise, glyphic languages include Chinese (traditional and simplified), Japanese and Korean writings as well as any other written language that is not represented by a relatively simple or small alphabet. Reference is made to CJK characters and is shorthand for all varieties of glyphs, characters, tetragraphs, tetragrams, symbols, ideograms and the like. The embodiments and techniques are generally for isolating individual characters or groups of characters (e.g., paragraphs, lines, words and individual glyphs) for further processing associated with one or more recognition or OCR techniques.

Figure 3:
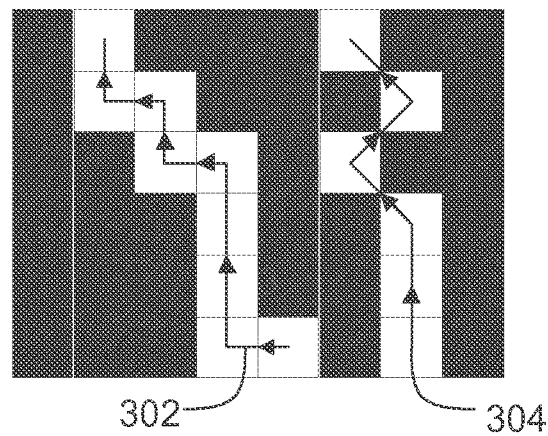
FIG. 3 illustrates an example of a 4-connected path 302 and a non-4-connected path 304.

FIG. 3 illustrates a first example of a 4-connected path 302 and a non 4-connected path 304. The 4-connected path 302 is a set of pixels continuously connecting one point in an image with another point in the image such that every intermediate pixel borders with the previous one, on one of the four sides, and with the next one, on one of the three remaining sides.

Figure 4:
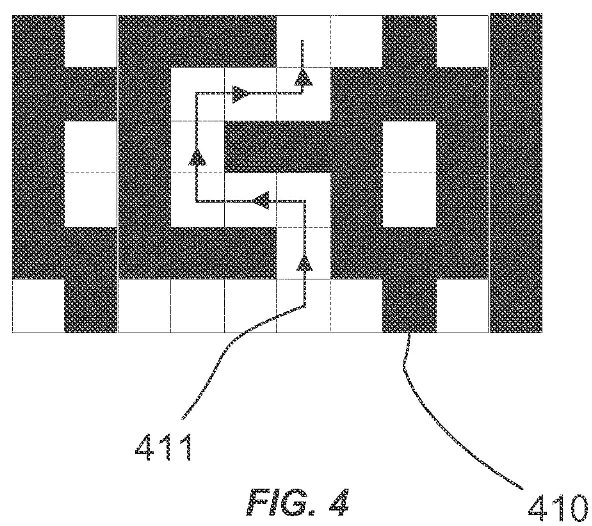
FIG. 4 illustrates an example of a gap 411 in the text string 410.

FIG. 4 illustrates a second example of a 4-connected path 411. In some embodiments, the 4-connected path 411 is a gap 411. The gap 411 is a space within a text line for which there is at least one 4-connected path in the text line between the highest (top) and the lowest (bottom) pixel of the text line. A text line, as described herein, can be a rectangle of pixels which includes images of characters in the text line. The text line is selected for further analysis for recognition purposes. In some embodiments, the text line is a line of text of a CJK line. A CJK line is a text line corresponding to a line of text fragment containing only CJK characters (e.g., tetragraphs, glyphs). In other embodiments, the text line includes a mixed line. As illustrated in FIG. 1, the mixed line is a line corresponding to a text fragment containing both CJK characters and non-glyphic characters (e.g., Arabic numerals, Latin letters, punctuation marks). Further, FIG. 4 illustrates a string of characters 410. The string of characters 410 is a set of characters in a text line. In some embodiments, the string of characters 410 can be a particular sequence of characters selected for analysis. As illustrated in FIG. 4, the gap 411 shows an example of a gap in the string of characters 410.

Before starting a recognition process, an initial image of a document, such as the one illustrated in FIG. 1, can be pre-modified. In some embodiments, the pre-modification of the initial image includes binarizing the image to transform the image into 1-bit color space. Additionally, the pre-modification can include deskewing the initial image to straighten the image. The initial image also may be pre-analyzed in order to identify the following non-exclusive list of information: (1) a language or a set of languages of the text on the image; (2) geometrical parameters (e.g., length and height) of each image block containing a text line; and (3) absolute or relative coordinates of each image block containing a text line (e.g., relative coordinates of the upper left corner of each image block containing a text line with respect to the upper left corner of the initial image of the document).

Figure 5:
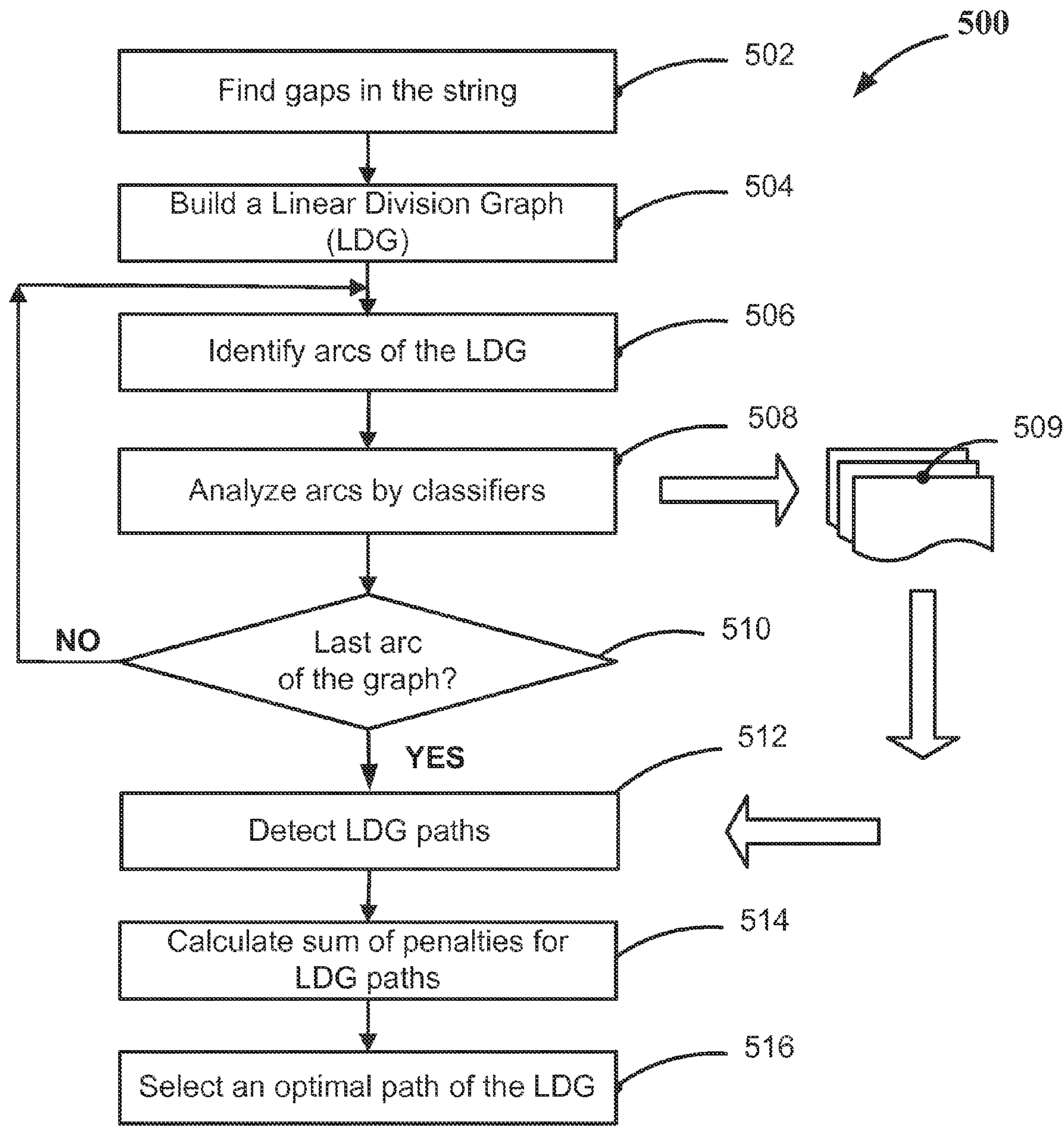
FIG. 5 illustrates a flow diagram of a method for defining a layout of an image of CJK text by a method usable for texts in European and other similar languages.

In FIG. 5, a flow diagram of a method 500 is provided. The method 500 can be used to define a layout of an image of text strings, for example and without limitation, the method 500 can be used for defining texts in European languages. Referring to FIG. 5, at block 502, the gaps in a selected string of characters of a text line are detected. At block 504, a linear division graph (LDG) is constructed according to the detected gaps. A linear division graph (LDG) is a graph that could be constructed by a computer OCR system while recognizing a line of characters. The nodes of this graph are the gaps found within the text line. In some embodiments, the gaps are between each character of a line of text.

At block 506, arcs of the LDG are identified. An arc of the graph is a hypothesis that there is a character between any two given gaps. Each arc of the graph is characterized with a numerical parameter and/or multiple numerical parameters denoting a probability that the hypothesis is true. At block 508, image fragments corresponding to all LDG arcs, turn by turn, are passed to a set of classifiers for analysis. A classifier is a programming module configured to calculate a predefined feature or a set of features for a given image fragment. A feature is a mathematical function computed on a certain image fragment. A feature type and set of calculated features can be predefined. A feature may also take its ordinary meaning when referring, for example, to a feature of a character. A classification result generally is an estimation of probability of encountering a particular character within the given image fragment, the image fragment undergoing analysis by the classifier. At block 509, the result of each turn is converted into a set of hypotheses.

Still referring to the method 500, after the last turn of the processing cycle, block 506 and block 508, each arc of the LDG receives a penalty according to an estimation and hypotheses selected by the classifiers 508. Every column outside of the selected area is considered as a "small" penalty of the LDG arc with the height corresponding to this column.

At block 512, after penalties are calculated for all arcs in the LDG, the LDG paths are detected. At block 514, a sum of the penalties for each of the LDG paths is calculated. Finally, at block 516, the path with the minimal sum of penalties is selected as an optimal path. The optimal path is considered a scheme for dividing a text line into character cells or positions. This optimal path is a result of text line recognition and/or processing. In other words, dividing a text line into character cells could be considered a part of the recognition process.

The method described in FIG. 5 works well for texts in European languages which usually consist of about 100-150 different or possible characters. In contrast, texts in CJK languages usually consist of about 30,000 to 40,000 different or possible characters and, correspondingly, these CJK texts need to use a set of 30,000 to 40,000 patterns. A pattern is a certain formal criterion of the image corresponding to a certain character. For example, the formal criterion for the character L can be defined in the following description: "there are two lines coming together at right angle in the left lower corner of the image." Each pattern can be previously learned for good correspondence to its character. The classifiers use patterns during recognition. The recognition program has many patterns of different characters in different languages.

However, this is computationally expensive. It is difficult to use the method described in FIG. 5 because of the requirement to use a huge number of CJK patterns (e.g. a set of 40,000 patterns). Moreover, the method described in FIG. 5 has the following drawbacks.

First, the method requires calculation or determination of a large number of LDG arcs. It is not possible to obtain a probability value for an LDG arc until the classifier processes all of the previous LDG arcs, i.e., those that connect the beginning of a line with its corresponding gap (the gap where the arc starts or ends). As a result, it is impossible to obtain the layout before running the classifier set. This is computationally expensive.

Second, it is impossible to define the line content before running the classifier, i.e., it is usually impossible to estimate or detect in advance if the line is mixed or contains only CJK characters. As a result, it is necessary to use both "European" and "CJK" classifier sets for each LDG arc.

Third, it is highly probable to encounter cases of incorrect dividing of a text line into character cells (positions for lines mixed with both Roman and CJK characters).

The method of the present disclosure overcomes the listed drawbacks. It provides significant acceleration of the OCR system, demands fewer computational resources and yields significantly fewer misrecognized characters.

Figure 6:
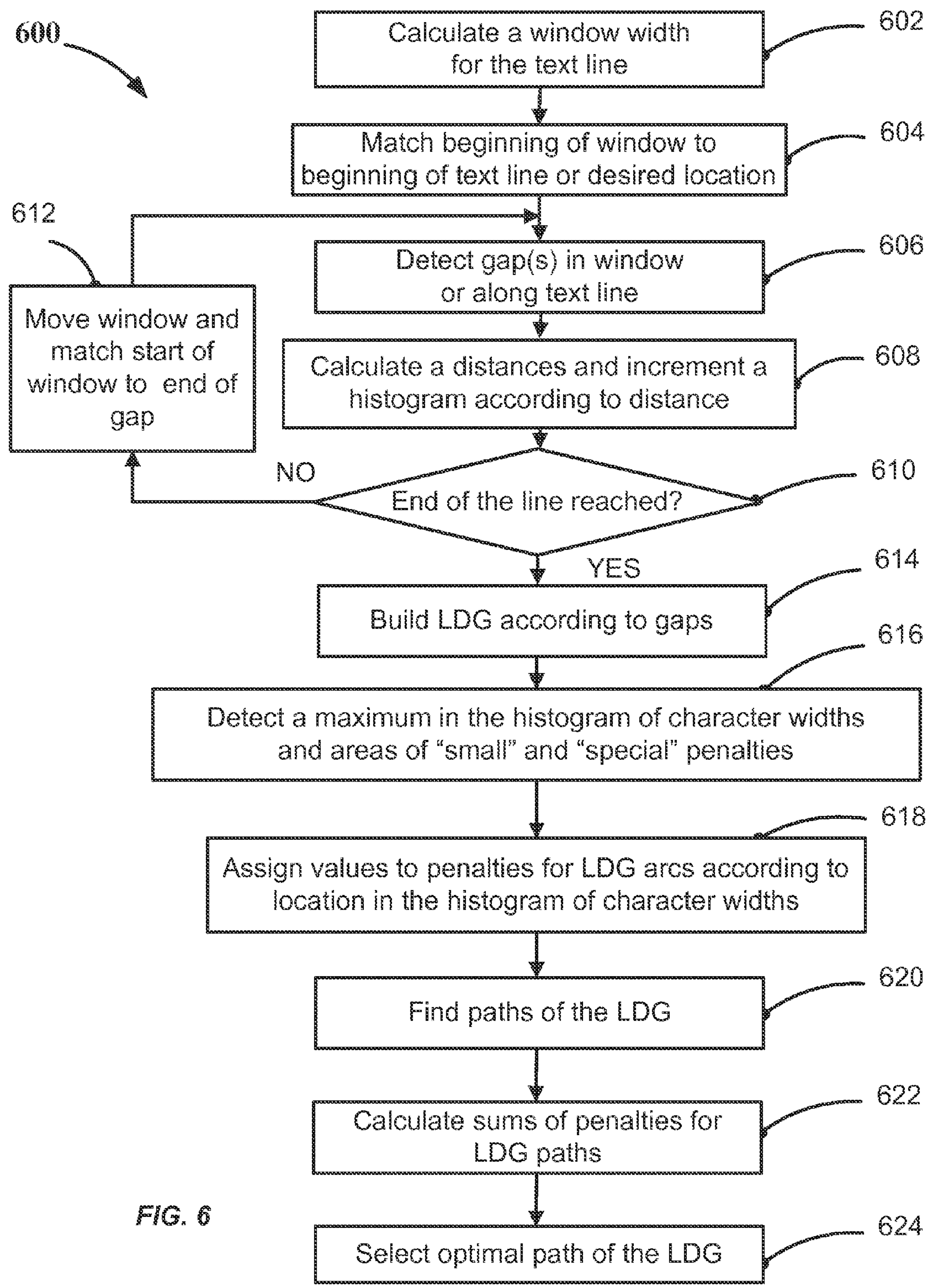
FIG. 6 illustrates a flow diagram of a method for defining a layout of an image of CJK text.

FIG. 6 illustrates a flow diagram of a method 600. The method 600 can be implemented on a computing device. In one embodiment, the method 600 is encoded on a computer-readable medium that includes instruction that, when executed by the computing device, cause the computing device to perform operations of the method 600. The method 600 can be used to define a layout of the image of text strings, for example when processing CJK texts.

At block 602, a window width is selected such as by a function of a given text line height and as a function of a set of defined recognition languages. A window is an imaginary defined frame with height of the frame generally equal to the height of the line of text or line of characters. In some embodiments, the window is a rectangular frame. The width and location of the window on the line can be different on each step of line processing, and with each particular line. A window width is language-independent. For example, if the height of the line of Chinese glyphs is about 120 pixels then a window width is about 3 by 120 or about 360 pixels. The width of the window may depend on a line height or a font size, or may be chosen based on the same. A font size can be different on different lines or in different documents.

At block 604, the beginning of the window is matched to the beginning of the text line. At block 606, gaps falling in the window (i.e., located within the window's width) are detected. In one embodiment, the gap is identified by locating in the window, a 4-connected path that is purely vertical where contiguous white pixels are located directly one above another.

At block 608, a distance (e.g., in pixels) from the beginning of the window to each pixel belonging to the gap is calculated. Columns of a histogram corresponding to the found distances are incremented. In some embodiments, a histogram includes a histogram of character cell widths showing frequencies of encountering a gap at a certain distance from the beginning of the window. The more frequent the gap, the higher a value is in the corresponding column of the histogram. For example, a higher value can provide a stronger indication of encountering a gap. If the gap is N pixels from the beginning of the window, the higher the N's column of the histogram will be.

At block 610, the method 600 determines if the end of the line of text has been reached. If no, the method 600 goes to block 612. If yes, the method 600 goes to block 614. At block 612, the window is moved and the beginning of the window is matched to the end of the found gap from block 610. Blocks 606, 608 and 610 may be repeated until the window reaches the end of the text line and all the gaps in the text line are found.

At block 614, a linear division graph (LDG) is constructed according to the detected gaps. The LDG is a graph that can be constructed by a processor of a computer configured to recognize characters in an image of text line, for example an OCR system. The nodes of this graph are the gaps found within the text line. In some embodiments, the nodes of the LDG are between each character.

At block 616, a histogram of character widths for the given line is obtained. Further, a pronounced maximum (or maxima) in the histogram is detected. In a neighborhood of the maximum, a histogram area is selected so that the height of each column in the selected area is at least a predefined part of the maximal height. Every column outside of this selected area is considered as a "small" penalty of the LDG arc with the height corresponding to this column. This area of small penalties is considered hereafter as a confirmed estimation of a typical character width for a given line. Histogram columns that are outside of the selected area hereafter are considered as "special" penalties of the LDG arcs with the height corresponding to these columns. The value of a special penalty directly depends on the distance of the corresponding arc from the baseline of the window of CJK text. Maximal special penalties correspond to the columns with maximal distances from the beginning of the window to the gap.

At block 618, every LDG arc, depending on its length, is assigned a small or a special penalty according to the histogram of the character widths. At block 620, the paths of the LDG are found. An LDG path is a sequence of arcs connecting the beginning and the end of a line of text (e.g., a true end, or a stopping point) and contains one or more sets of LDG nodes where an LDG node generally correlates with a gap between characters. In some implementations, the LDG path is a variant of dividing a text line into characters at LDG nodes.

At block 622, a sum of the penalties for paths is calculated. LDG paths with transitions from small to special penalties or vice versa are additionally penalized for each such transition.

Finally, at step 624, the path with the minimal penalty sum is chosen or selected as an optimal path. Hereafter the optimal path is considered as a scheme for dividing a text line into character cells.

In other embodiments, another criteria system can be used instead of penalties to find an optimal path on the basis of highest probabilities. As an additional benefit of using the described implementation, if the optimal path does not contain lines with a special penalty, the line layout with highest probability contains only CJK characters. If the optimal path contains arcs with special penalties, the line fragments corresponding to these arcs with high probability contain characters that are not CJK characters (e.g, Arabic numerals, punctuation marks, Latin characters). The results related to both line layout and preliminary interpretation of the characters contained there, are obtained without any traditional recognition of a character and without using any classifier.

There are many advantages associated with the above-described method. For example, there are fewer LDG arcs than in alternative methods such as the one shown in FIG. 5. Further, a probability estimation (i.e., penalty or special penalty) for every LDG arc can be obtained without any classifier. The described method provides fully a priori (without recognition of a character) text line layout and identification of character cells. The method enables obtaining a verified value of a typical character cell width for a given text line. The method also enables a program to define with high probability whether the text line is mixed or contains only CJK characters before starting a character classifying process. The method saves computational resources of a computer by using only those patterns that are necessary to recognize the given text. Therefore, it significantly accelerates the character recognition process for CJK texts. The method reduces to a negligible quantity the probability of errors when the arcs of the CJK text lines in a LDG with the maximal probability values do not correspond to real or actual character locations. The method significantly reduces the probability of encountering a situation where the arcs with the maximal probability values correspond to the CJK characters, when these places in the initial text contain characters of a European alphabet.

Figure 7:
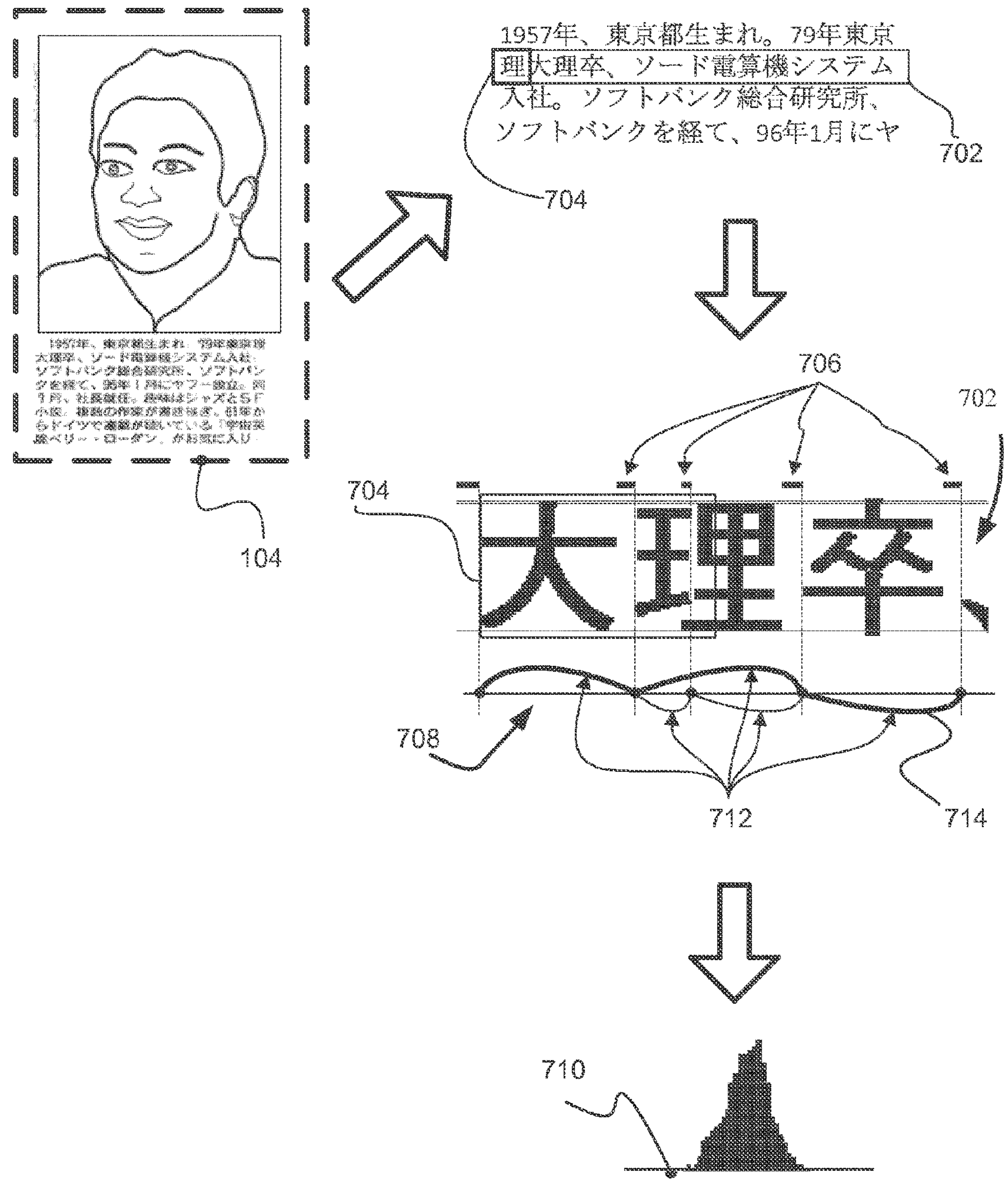
FIG. 7 illustrates a visual overview of a method for defining a layout of an image of CJK text.

FIG. 7 illustrates a visual overview of the method described in FIG. 6, with a portion of the image shown in FIG. 1. As illustrated in FIG. 7, a portion of the caption under the portrait 104 is identified. One row or line of text 702 is identified for processing. A window 704 is placed or oriented at a desired or starting place along the line of text 702. The gaps 706 are detected or identified in the line of text 702. Distances are calculated from starting points, for example a first side of a window 704, to the respective gap or gaps 706 (e.g., those within the window 704, or along the line of text 702). These values are tabulated into a histogram 710. An LDG 708 is built according to the detected gaps 706. Once the LDG has been built, the arcs 712 are generated and penalties are applied to the arcs where the penalties are related to the maxima in the histogram 710. Next, the LDG paths are found. Finally, an optimal path 714 (bold arcs on the drawing) is selected from a plurality of paths. The optimal path 714 can be selected from a numerical analysis of the line of text 702.

Turning now to Korean languages, its specificities should be noticed. FIG. 8 illustrates an example of an image of a document 800. The image of the document 800 includes Korean text mixed with some Roman characters. Further, FIG. 8 includes a text 802, which provides an English translation of the Korean text in the image of the document 800. At a first glance, Korean languages can't be distinguished from the group of Chinese, Japanese and Korean languages, but they have some distinctive features. For example, one distinctive feature of Korean electronically imaged texts is glued glyphs. Glued glyphs can refer to several Korean characters that are contiguous to each other. The glyphs get glued in consequence of a bad quality of imaged text. Broadly, even if the text is high-resolution, those connections exist. These glued glyphs can appear to be joined together, as in a single character as opposed to two separate characters.

Figure 9:
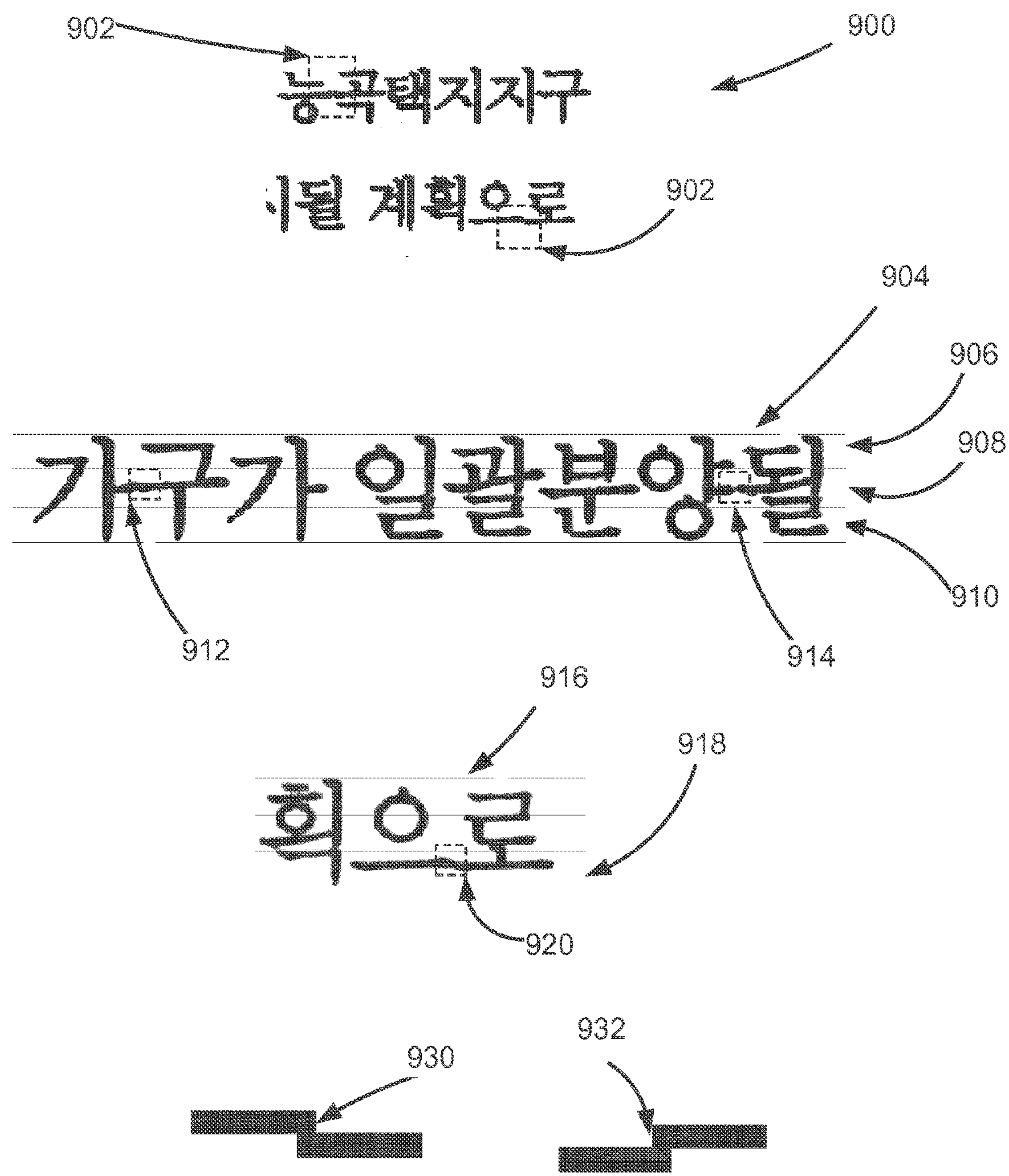
FIG. 9 illustrates a first visual overview of a method for detecting a junction in an image of CJK text.

FIG. 9 illustrates examples of images of selected text lines 900, 904, and 916. In some implementations, the selected text lines 900, 904, and 916 are selected from the image of Korean document 800. The selected text line 900 of the image contains two examples of glued glyphs 902 which are several Korean characters that are contiguous to each other. The glued glyphs 902 affect the ability to detect gaps, because there is no way to find a 4-connected path between two neighbor glued characters. Therefore, methods and systems described herein include an improved method to account for glued glyphs, a distinctive feature of the Korean text.

In some implementations, a glued glyph is referred to as a junction. A junction is a location of a text line where two neighbor glyphs have been accidentally connected. FIG. 9 shows four examples of junctions 902, 912, 914, 920. To detect junction 902, the text line 904 can be divided into three horizontal stripes having equal height. As illustrated in FIG. 9, the text line 904 can be divided into a top stripe 906, a middle stripe 908 and a low stripe 910. Due to specific peculiarity of the Korean glyphs, junction characters never exist in the top stripe 906. However, both the middle stripe 908 and the low stripe 910 of any Korean text line can contain junctions. The text line 904 contains two junctions, 912 and 914 in the middle stripe 908. Likewise, the text line 916 can be divided into three horizontal stripes to detect junctions. As illustrated in FIG. 9, the text line 916 contains a junction 920 in a low stripe 918.

A rung is part of a text line whose position has been accidentally changed due to the connection of two neighbor glyphs, an important feature of most junctions in Korean text lines. Horizontal elements of two neighbor glyphs usually have some difference in a thickness or in positions. If such elements get glued in a junction together, the junction forms a rung. FIG. 9 shows two examples of rungs 930, 932. Said rungs can be found on the image of the text line.

Figure 10:
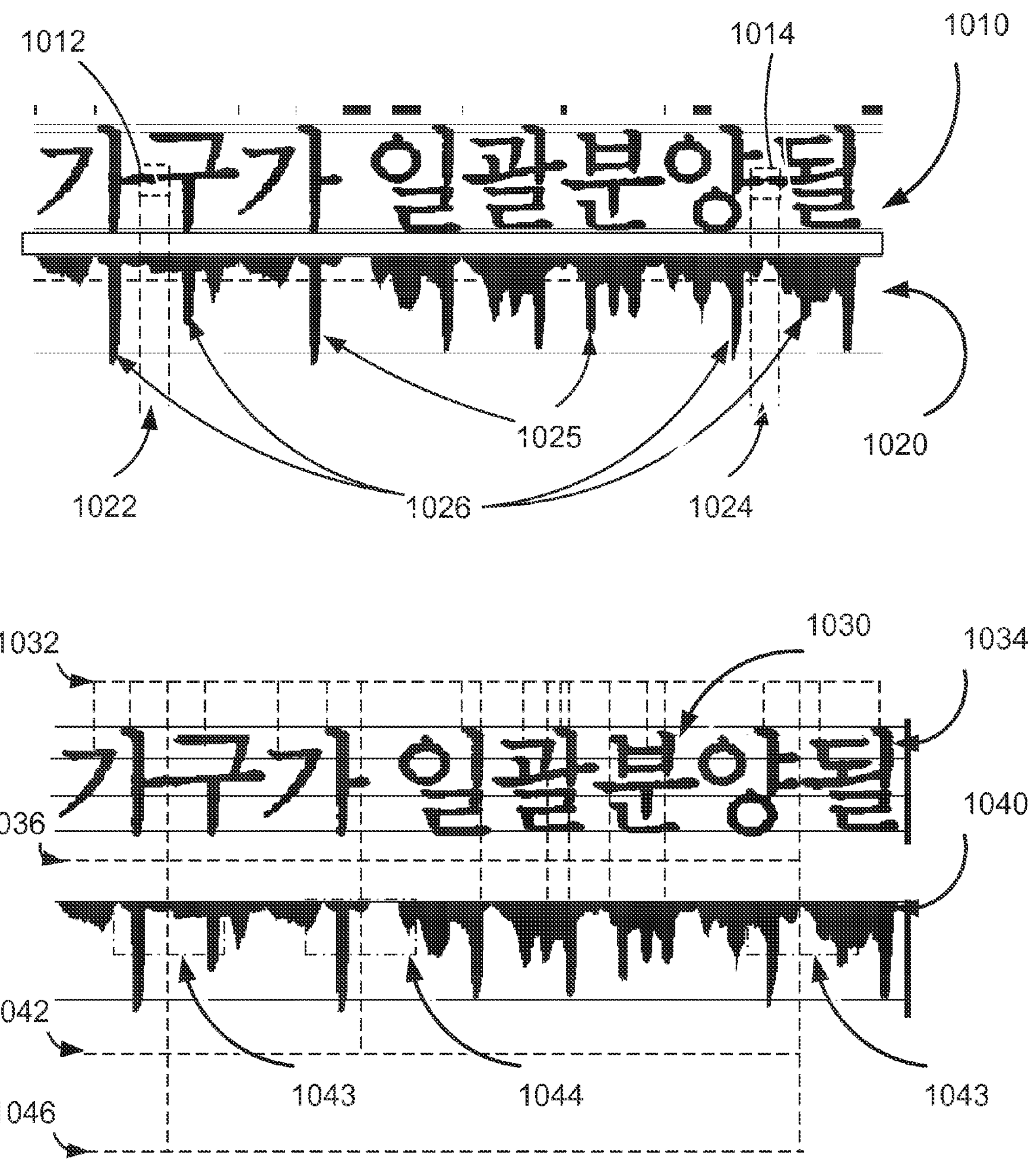
FIG. 10 illustrates a second visual overview of a method for detecting a junction in an image of CJK text.

In some embodiments, the junctions 930, 932 of the text line are thin horizontal or almost horizontal strokes. To detect the junctions 930, 932 a color histogram can be created. The color histogram is a histogram of the quantity of the colored pixels. In one embodiment, the color histogram is a BQ-histogram based on the quantity of black pixels in a text line. In the color histogram, every column corresponds to the quantity of the color pixels on a horizontal straight line connecting the highest (top) pixel and the lowest (bottom) pixel of the text line. FIG. 10 shows an example of the color histogram 1020 corresponding to the image of the text line 1010.

As illustrated in FIG. 10, the junctions 1012, 1014 of the text line 1010 correspond to plateau zones 1022, 1024 on the color histogram 1020. The plateau zones 1022, 1024 are areas of the color histogram 1020 having nonzero, but low level of color on the color histogram 1020. The color histogram 1020 corresponds to the text line 1010. The color histogram 1020 includes two plateau zones 1022, 1024 corresponding to the two junctions 1012, 1014. A level of the black in the plateau zones 1022, 1024 is low but nonzero.

In some embodiments, to detect junctions 1012, 1014 with the color histogram 1020, the color histogram 1020 can be analyzed for peaks 1025, 1026. The peaks 1025, 1026 are a part of the color histogram 1020 including a high level of color pixels. In more detail, the glyphs can contain vertical or sloping strokes, as well as various shapes, including circles and squares. Due to this reason, each glyph usually has correspondent peaks 1022, 1024 on the color histogram 1020. In particular, the plateaus 1022, 1024 corresponding to the appropriate junctions 1012, 1014 have a correspondent peak on each side, one to the right of the plateaus 1022, 1024 and one to the left of the plateaus 1022, 1024.

Still referring to FIG. 10, the color histogram 1020 includes multiple peaks 1025, 1026. In some embodiments, the peaks 1025, 1026 are referred to as neighbor peaks because they are next to the plateau zones 1022, 1024 on the color histogram 1010. The area around the plateau zones 1022, 1024 can be referred to as a gateway. The gateway is a area on the color histogram 1010, including two peaks 1025, 1026 and one plateau 1022, 1024. In some embodiments, a distance between the two peaks 1025, 1026 is equal to the top of the line. However, the gateway is a common element for the color histogram 1020 of a line of text 1010. In some embodiments, the gateways do not correspond to any junction 1012, 1014. Therefore, the analysis of stripes and rungs, as described in FIG. 9, of the image of the line of text 1010 is important to determining if a gateway corresponds to the junction 1012, 1014.

In some embodiments, to detect the junction electronic images of the Korean texts, the following logical expression can be performed:

```
IF (a "rung" found on the image of the line)
        AND (it has been found NOT in "top" stripe of the line)
        AND (a "gateway" exists in the correspondent place of the
        BQ-histogram)
THEN the "rung" is a junction.
END IF
```

Further, FIG. 10 illustrates an image 1030 of a line of Korean text. As illustrated in FIG. 10, the image 1030 of the line of Korean text includes rungs 1032. However, some of the rungs 1032 are in the top stripe 1034 of the line of text 1030. Therefore, these rungs 1032 are ignored and not used in further detection. A color histogram 1040 is created based on the image 1030 of the line of text. The color histogram includes plateaus 1042 corresponding to rungs 1036 of the line of text. Some of the rungs 1036 are located in the bottom stripe, while others are located in the middle stripe and therefore are used further in detecting a junction. The area around the plateaus 1042, is analyzed for peaks to determine if peaks exist on each side of the plateau 1042. If yes, this area corresponds to a gateway 1043, which is a new junction. If no, the area around the plateau does not correspond to a gateway 1043. Due to this way of analyzing the image 1030 of the line of text, it is not necessary to analyze all of the existing peaks the color histogram.

Figure 11:
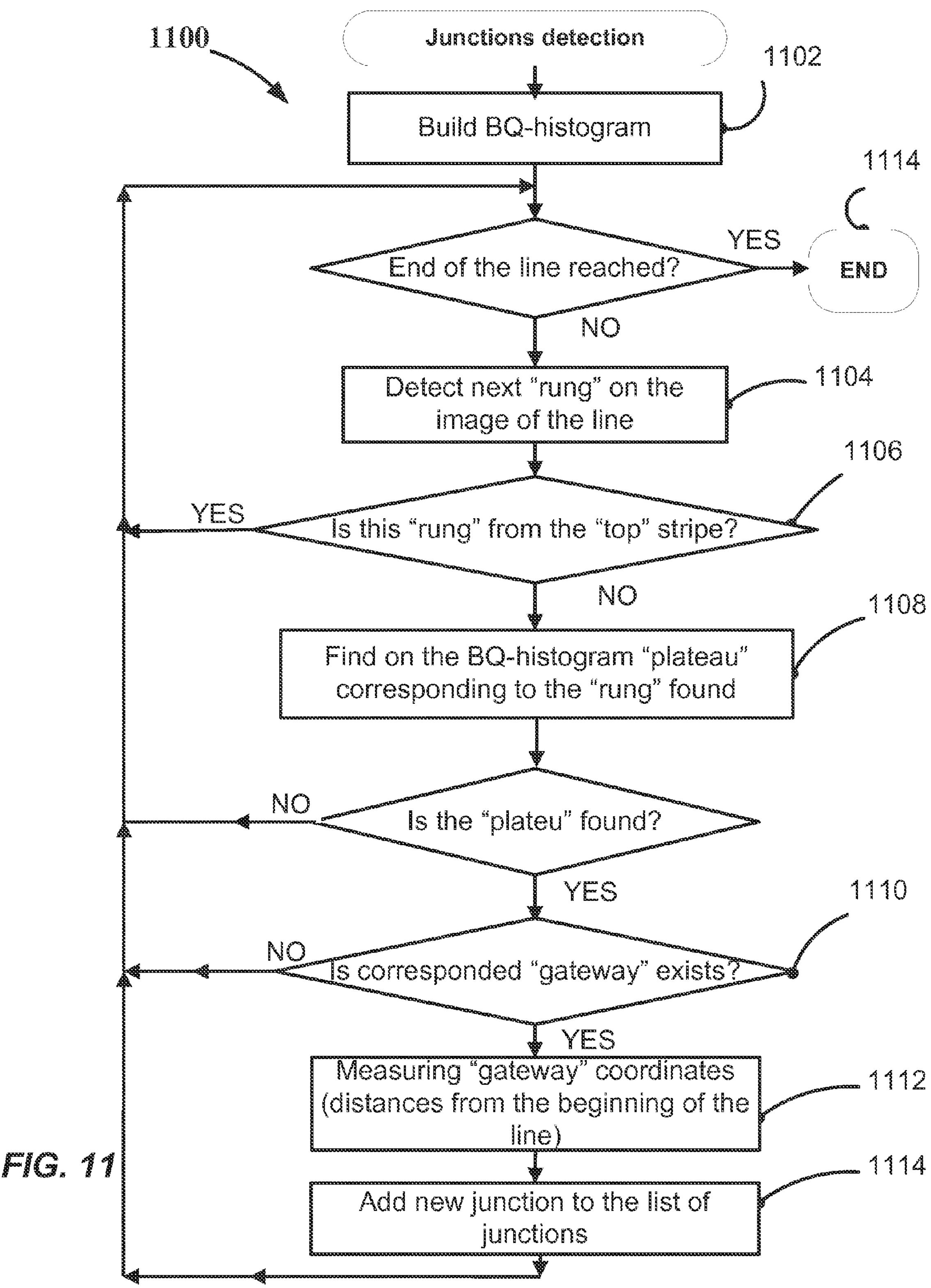
FIG. 11 illustrates a method for detecting a junction in an image of CJK text.

FIG. 11 illustrates a flow diagram of a method 1100 for detecting a junction in a line of text. The method 1100 can be implemented on a computing device (e.g., hardware 1300 to be described in regards to FIG. 13). In one embodiment, the method 1100 is encoded on a computer-readable medium that contains instructions that, when executed by the computing device, cause the computing device to perform operations of the method 1100.

At block 1102 a color histogram is created. In some embodiments, the color histogram is created by calculating the number of color pixels in a horizontal line of a portion of a line of text. The line of text can be a selected sequence of characters to be analyzed. The number of color pixels can be summed from the top of the horizontal line to the bottom of the horizontal line. In some embodiments, the color histogram is a BQ-histogram, created by calculating the number of black pixels in a horizontal line of a portion of a line text. Once the color histogram has been created, a determination is made if the method 1100 has reached the end of the line of text. If the end of line has been reached, the method 1100 ends. If the end of the line of text has not been reached, the method proceeds to block 1104.

At block 1104, the line of text is searched to determine if a rung or if multiple rungs exist. The rungs can be identified based on a difference in thickness and/or position of the horizontal or almost horizontal strokes on the image of the line of text. In some embodiments, the rungs represent an accidental joining of two neighboring characters in a line of text. An important feature of Korean text is that strokes of neighboring characters typically have a difference in thickness and/or position. This feature can be used to identify the location of rungs on the image of a line of text. Once the rung has been detected, the method 1100 proceeds to block 1106.

At block 1106, the horizontal position of the identified rungs is determined. The image of the line of text can be divided into three horizontal regions, a top strip, a middle stripe, and a bottom stripe. Due to specific peculiarity of the Korean glyphs, the glued or accidently joined characters do not exist in the top stripe. Therefore, if the rung is detected in the top stripe it can be ignored. The method 1100 can return to block 1102. However, the identified rung is positioned in the middle stripe or the bottom stripe, the method proceeds to block 1108.

At block 1108, the color histogram is analyzed for a plateau. In more detail, the portion of the color histogram corresponding to the identified rung in the line of text is analyzed for a plateau. The plateau is an area of the color histogram having a nonzero, but low level of color pixels on the color histogram. In some embodiments, plateaus corresponding to each identified rung from the bottom and middle stripes are detected on the color-histogram. If no plateau is found corresponding to the identified rung, the method 1100 returns to block 1102. If a plateau is identified corresponding to the identified rung, the method 1100 proceeds to block 1110.

At block 1110, the plateau detected in block 1108 is analyzed to identify gateways. In more detail, the area on the color histogram around the color pixel is analyzed for peaks. In some embodiments, is the plateau has a neighboring peak on each side of it on the color histogram, the plateau is considered a gateway. Because the characteristics of gateways can be common traits of color histograms for Korean text, in some embodiments, only gateways associated with rungs and plateaus are considered junctions. A junction is the accidental joining of two neighboring characters. If no gateway is detected, the method 1100 returns to block 1102. If a gateway is detected, the method 1100 proceeds to block 1112.

At block 1112, the coordinates of the gateway are measured. In some embodiments, the coordinates of the gateway can be measured by calculating a number of pixels from the start of the line of text to the gateway. In other embodiments, the gateway can be described as a range of distances. For example and without limitation, the gateways can be described as a $1^{st}$ junction—79 . . . 86 pixels, and a $2^{nd}$ junction—123 . . . 154 pixels (from the beginning of the line). The range of distances can include a range of pixels in the line of text.

Finally, at block 1114, the coordinates of the gateway are added to a junction list. The junction list can include all identified gateways (i.e., junctions) in the line of text. The junction list can include characteristics of the gateways.

Figure 12:
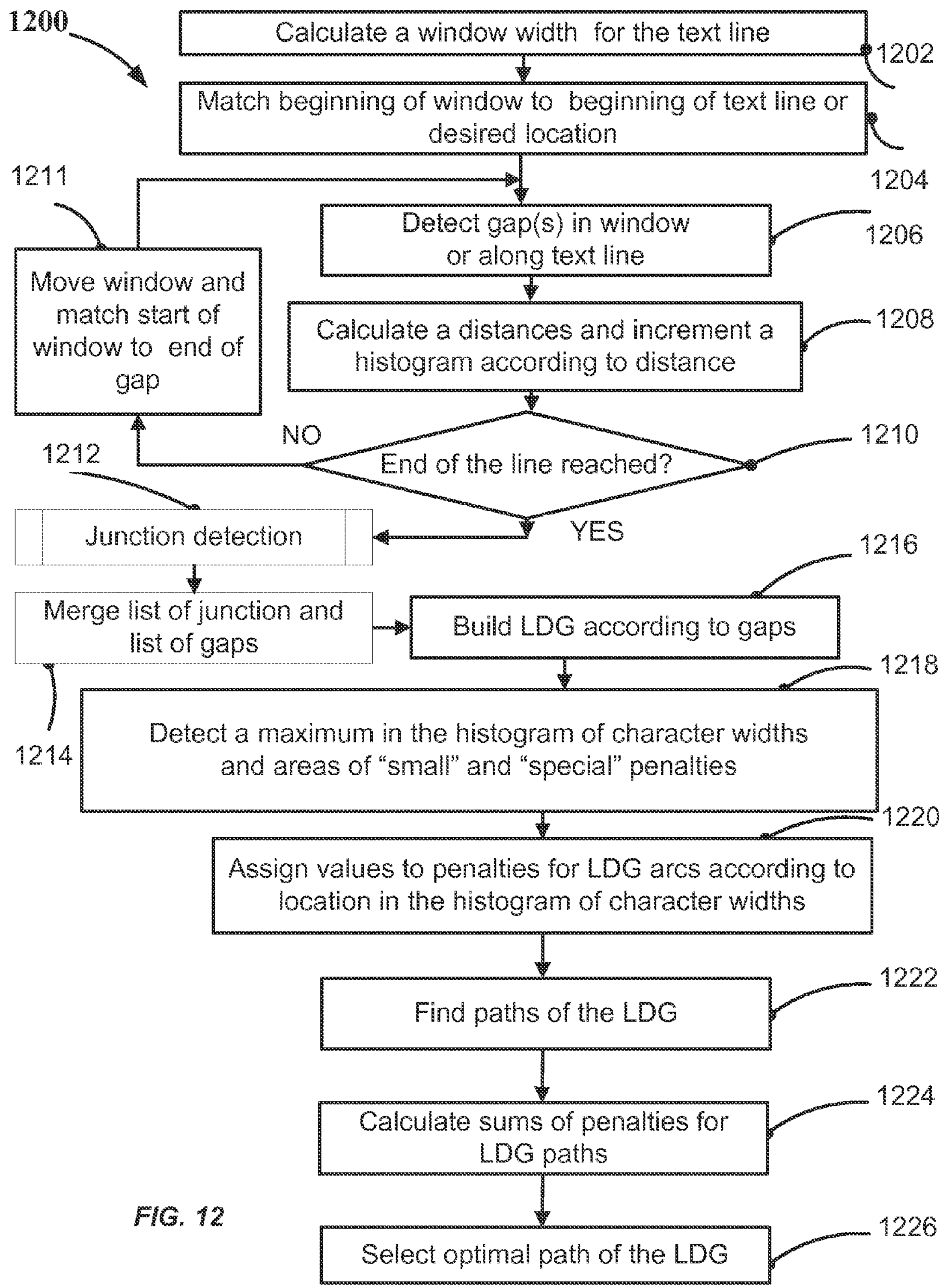
FIG. 12 illustrates a flow diagram of a method for defining a layout of an image of Korean text.

FIG. 12 illustrates a flow diagram of a method 1200 for defining a layout of text lines. The method 1200 can be used for defining a layout of text lines of Korean characters on the images. In some embodiments, the method 1200 further includes aspects of method 1100 as described in FIG. 11, as well as aspects of method 600 as described in FIG. 6. Blocks 1202-1211, and 1216-1226 of method 1200 can correspond to blocks of method 600 described in FIG. 6. Further block 1212 of method 1200 can correspond to method 1100 described in FIG. 11.

In more detail, method 1200 begins at block 1202, where a window width for the text line is calculated. At block 1204, the beginning of the window is matched to the beginning of the text line or desired location. Then, at block 1206, the gaps located in the window are detected along the text line. At block 1208, a distance from the beginning of the window to each pixel belonging to the gap is calculated. Further, the columns of the histogram corresponding to the calculated distances is incremented. At block 1210, a determination is made if the method 1200 has reached the end of the line of text. If no, the method 1200 proceeds to block 1211. If the method 1200 has reached the end of the line of text, the method 1200 proceeds to block 1212. At block 1211, the window is moved to the end of the previously identified gap and then returns to block 1202. At block 1212, the line of text is analyzed to identify any junctions. In some embodiments, block 1212 is the same process as described in method 1100, blocks 1102-1114.

At block 1214, the list of junctions is merged with the list of gaps. It is important to note that all junctions may be considered gaps. Therefore junctions and gaps can be used together in further processing. In some embodiments, the junctions of a line of text are gaps that have been accidently joined together or glued. In one embodiment of the disclosure, the list of the gaps found during blocks 1206-1211 can be described as a range of the distances, for example as a range of a number of pixels from the start of a line of text to the detected gap. In this embodiment, the merging of the junction list and the gap list can be performed by adding the two lists together. In another embodiment, all of the junctions can be previously scaled by setting of some penalty value. This penalty value can be the same for all junctions. In other embodiments, the penalty value can be different for each junction, dependent upon other previously calculated parameters, for example, width of the plateau, or distance between peaks or any other parameter calculated to detect the junction in method 1100.

Once the lists have been merged, at block 1216, a linear division graph is constructed according to the detected gaps and the detected junctions. Next, at block 1218, a maximum in the histogram of character widths is detected. Further, areas of small and special penalties are detected, similar to the small and special penalties detected in block 616 of method 600. At block 1220, values are assigned to penalties for the LDG arcs according to the location in the histogram of the character widths. At block 1222, the paths of the LDG are detected. At block 1224, the sum of the penalties for the LDG paths is calculated. Finally, at block 1226, an optimal path of the LDG is selected. The optimal path can be the path with the minimum penalty sum. A stated above, the processes described in blocks 1202-1211 and 1216-1226 of method 1200 can be performed in the same manner as the processes described in blocks 602-624 of method 600.

Figure 13:
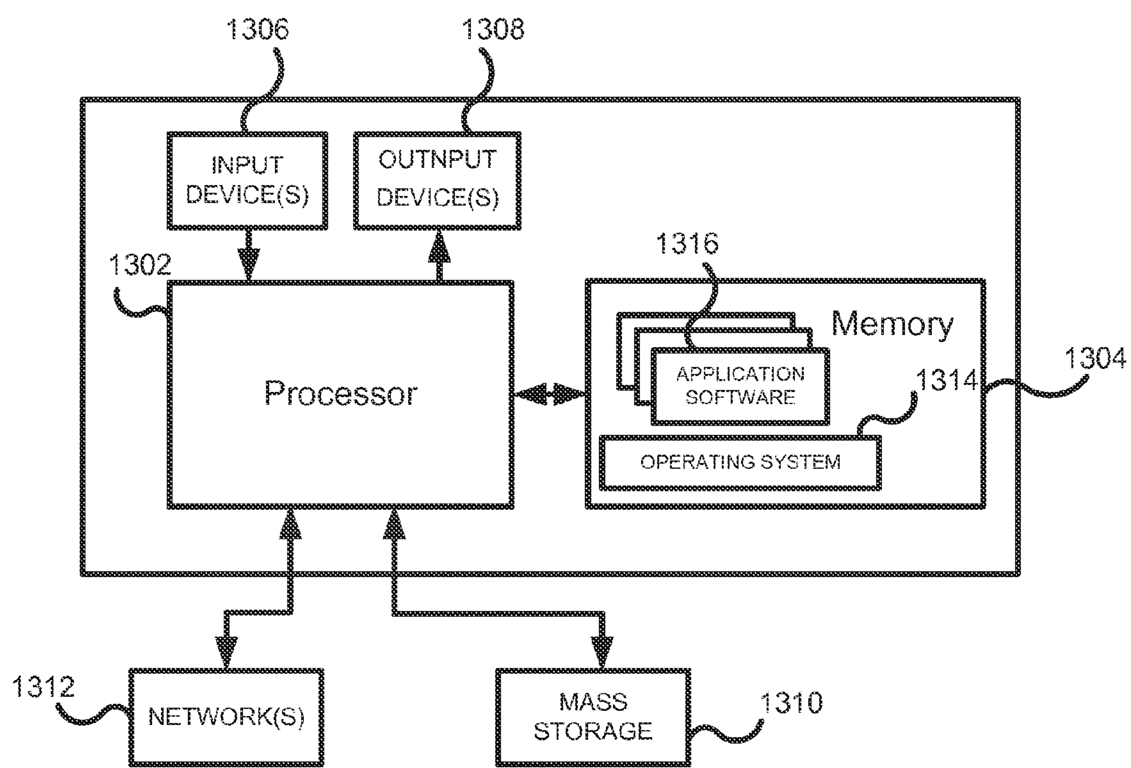
FIG. 13 illustrates a block diagram of an example hardware for implementing a computer system to define a layout of an image of CJK text.

Referring now to FIG. 13, FIG. 13 illustrates a block diagram of a hardware 1300. The hardware 1300 can be used to implement the techniques disclosed herein is shown, in accordance with an embodiment of the present disclosure. As illustrated in FIG. 13, the hardware 1300 includes at least one processor 1302 coupled to a memory 1304. The processor 1302 can represent one or more processors (e.g., microprocessors), and the memory 1304 can represent random access memory (RAM) devices comprising a main storage of the hardware 1300, as well as any supplemental levels of memory, e.g., cache memories, non-volatile or back-up memories (e.g. programmable or flash memories), read-only memories, etc. In addition, the memory 1304 can include memory storage physically located elsewhere in the hardware 1300, e.g. any cache memory in the processor 1302, as well as any storage capacity used as a virtual memory, e.g., as stored on a mass storage device 1310.

The hardware 1300 is configured to receive a number of inputs and outputs for communicating information externally. For interface with a user or operator, the hardware 1300 can include one or more user input devices 1306 (e.g., a keyboard, a mouse, a scanner etc.) and a display 1308 (e.g., a Liquid Crystal Display (LCD) panel). For additional storage, the hardware 1300 can include one or more mass storage devices 1310, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 1300 can include an interface with one or more networks 1312 (e.g., a local area network (LAN), a wide area network (WAN), a wireless network, and/or the Internet among others) to permit the communication of information with other computers coupled to the networks. In some embodiments, the hardware 1300 includes suitable analog and/or digital interfaces between the processor 1302 and each of the components 1304, 1306, 1308 and 1312 as is well known in the art.

In some embodiments, the hardware 1300 operates under the control of an operating system 1314, and executes various computer software applications, components, programs, objects, modules, etc. indicated collectively by reference numeral 1316 to perform the techniques described above, for example the methods described in FIGS. 5, 6, 11, and 12.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the disclosure. Moreover, while the disclosure has been described in the context of fully functioning computers and computer systems, those skilled in the art will appreciate that the various embodiments of the disclosure are capable of being distributed as a program product in a variety of forms, and that the disclosure applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others.

Although the present disclosure has been described with reference to specific exemplary embodiments, it will be evident that the various modification and changes can be made to these embodiments without departing from the broader spirit of the disclosure. Accordingly, the specification and drawings are to be regarded in an illustrative sense rather than in a restrictive sense.

While certain exemplary embodiments have been described and shown in the accompanying drawings, it is to be understood that such embodiments are merely illustrative and not restrictive of the broad disclosure and that this disclosure is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

What is claimed is:

1. A method for detecting a junction in a received image of a line of text to update a junction list with descriptive data, the method comprising:

- creating a color histogram based on a number of color pixels in the received image of the line of text;
- detecting, based at least in part on the received image of the line of text, a rung within the received image of the line of text;
- identifying a horizontal position of the detected rung in the received image of the line of text;
- additionally identifying a gateway on the color histogram, wherein the identified gateway is associated with the detected rung; and
- updating the junction list with data including a description of the identified gateway.

2. The method of claim 1, wherein creating the color histogram further comprises summing the number of color pixels in a straight horizontal line of the received image of the line of text.

3. The method of claim 1, wherein detecting the rung further comprises detecting a difference in thickness and position of the horizontal or almost horizontal strokes of the symbols in the received image of the line of text.

4. The method of claim 1, wherein identifying the horizontal position further comprises dividing the received image of the line of text into three horizontal regions comprising a bottom stripe, a middle stripe, and a top stripe.

5. The method of claim 4, wherein identifying the horizontal position further comprises identifying that the detected rung is positioned in the bottom stripe or the middle stripe.

6. The method of claim 1, wherein identifying the gateway further comprises identifying a plateau on the created color histogram, wherein the plateau corresponds to a low level on the created color histogram.

7. The method of claim 6, wherein identifying the plateau further comprises detecting a peak on each side of the plateau on the created color histogram.

8. The method of claim 1, further comprising calculating a pixel distance from a start of the received image of the line of text to the identified gateway.

9. A system for detecting a junction in a received image of a line of text to update a junction list with descriptive data, the system comprising:

- a memory configured to store processor-executable instructions; and
- a processor operatively coupled to the memory, wherein the processor is configured to:
  - create a color histogram based on a number of color pixels in the received image of the line of text;
  - detect, based at least in part on the received image of the line of text, a rung in the received image of the line of text;
  - identify a horizontal position of the detected rung in the received image of the line of text;
  - additionally identify a gateway on the color histogram, wherein the identified gateway is associated with the detected rung; and
  - update the junction list with data including a description of the identified gateway.

10. The system of claim 9, wherein the created color histogram is a quantity of color pixels in a straight horizontal line of the received image of the line of text.

11. The system of claim 9, wherein the detected rung is a portion of the received image of the line of text where two neighbor characters are joined.

12. The system of claim 9, wherein the horizontal position corresponds to one of three horizontal regions of the received image of the line of text, wherein the three horizontal regions comprise a bottom stripe, a middle stripe, and a top stripe.

13. The system of claim 12, wherein the horizontal position of the detected rung is in the bottom stripe or the middle stripe.

14. The system of claim 9, wherein identification of the identified gateway is based at least in part on identification of a plateau on the created color histogram, and wherein the plateau corresponds to a low level on the created color histogram.

15. The system of claim 14, wherein the processor is configured to detect a peak on each side of the plateau on the created color histogram.

16. The system of claim 9, wherein the description of the identified gateway includes a pixel distance from a start of the received image of the line of text to the identified gateway.

17. A non-transitory computer-readable storage medium having computer-readable instructions stored therein, the instructions being executable by a processor of a computing system, wherein the instructions comprise:

- instructions to create a color histogram based on a number of color pixels in a received image of a line of text;
- instructions to detect, based at least in part on the received image of the line of text, a rung in the received image of the line of text;
- instructions to identify a horizontal position of the detected rung in the received image of the line of text;
- instructions to identify a gateway on the created color histogram associated with the detected rung; and
- instructions to update a junction list with data including a description of the identified gateway.

18. The non-transitory computer-readable storage medium of claim 17, wherein the created color histogram is a quantity of color pixels in a straight horizontal line of the received image of the line of text.

19. The non-transitory computer-readable storage medium of claim 17, further comprising instructions to identify a plateau on the created color histogram, wherein the plateau corresponds to a low level on the created color histogram, and wherein the identified gateway is identified based at least in part on the plateau.

20. The non-transitory computer-readable storage medium of claim 19, further comprising instructions to detect a peak on each side of the plateau on the created color histogram.

* * * * *